R. Staubel,
Spectacles.

No. 93,020.      Patented July 27, 1869.

Witnesses:
Hinchman
Jno. R. Brooks

Inventor:
R. Staubel
per Munn & Co.
Attorneys.

United States Patent Office.

RICHARD STRAUBEL, OF WILLIAMSBURG, NEW YORK.

Letters Patent No. 93,020, dated July 27, 1869.

IMPROVEMENT IN EYE-GLASSES.

The Schedule referred to in these Letters Patent and making part of the same.

*To all whom it may concern:*

Be it known that I, RICHARD STRAUBEL, of Williamsburg, in the county of Kings, and State of New York, have invented a new and useful Improvement in Eye-Glasses; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
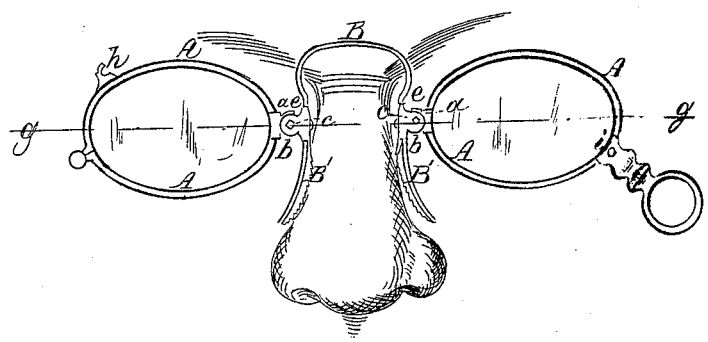
Figure 1 represents a front view of my improved eye-glass, showing it expanded.

The object of this invention is to so construct the frame of a pair of eye-glasses that the glasses, when applied, will be in a horizontal line, as they are in spectacles, and that when the instrument is folded together, the ends of the U-spring will not project to be caught in the pockets or otherwise.

The invention consists chiefly in arranging small coiled springs around the pivots, by which the glass frames are connected with the U-spring, so that thereby the glasses are held in the proper level, while they are allowed to be held against the ends of the U-spring, to protect the same when folded together.

In the ordinary eye-glasses now in use, the glasses are suspended in an inclined position from the sustaining-springs, and are not straight, as in spectacles, their position being thus less convenient and proper than it is in the latter instrument, which difficulty is entirely overcome by my invention.

A A, in the drawing, are the two glass frames, of oval or other suitable shape.

B is the central U-shaped spring, carrying the nose-pieces B', by which the instrument is secured to the nose.

From the frames A project ears *a a*, which fit between ears *b b*, that project from the two sides of the spring B.

Pins *c c*, which are with their ends securely fastened in the ears *b* by being squared or otherwise, fit through enlarged apertures of the ears *a*.

Figure 3:
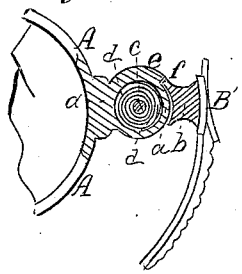
Figure 3 is a sectional view of the same on an enlarged scale.

In the aperture of each ear *a* is arranged a small coiled spring, *d*, which is, as in fig. 3, with its inner end secured to the pin *c*, while its outer end is secured to the ear *a*, as shown.

These springs *d* form, therefore, together with the pins *c* and ears *a b*, the connections between the frames A and holder B, and have the tendency to throw the frames A up, until shoulders *e* on their ears *a* strike shoulders *f*, or other stops on the spring B, as in fig. 3. The glasses are thereby held in line when applied as indicated by the red line *g g* in fig. 1.

Figure 2:
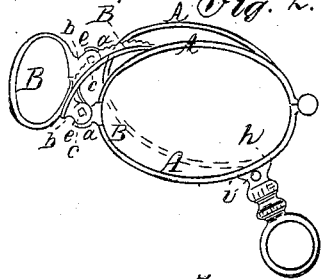
Figure 2 is a face view of the same, showing it folded together.

When the instrument is, however, folded together, as in fig. 2, so that a hook or catch, *h*, on one frame A, fits over and is held by a pin, *i*, of the other frame A, the frames A are pushed against the ends of the spring B, the springs *d* yielding to allow this position. The ends of the spring B are thus held secure, and are guarded, so that they cannot be caught on garments or otherwise.

Having thus described my invention,

What I claim as new, and desire to secure by Letters Patent, is—

The nose-pieces B', suspended from the spring B, and pivoted to the glass frames A by means of the lugs *a b*, enclosing the spring *d*, as herein described, for the purpose specified.

RICHD. STRAUBEL.

Witnesses:
FRANK BLOCKLEY,
ALEX. F. ROBERTS.